Jan. 23, 1962 W. T. RANKER 3,017,855
APPARATUS FOR APPLYING A COATING TO JOINTS IN PIPELINES
Filed June 15, 1959
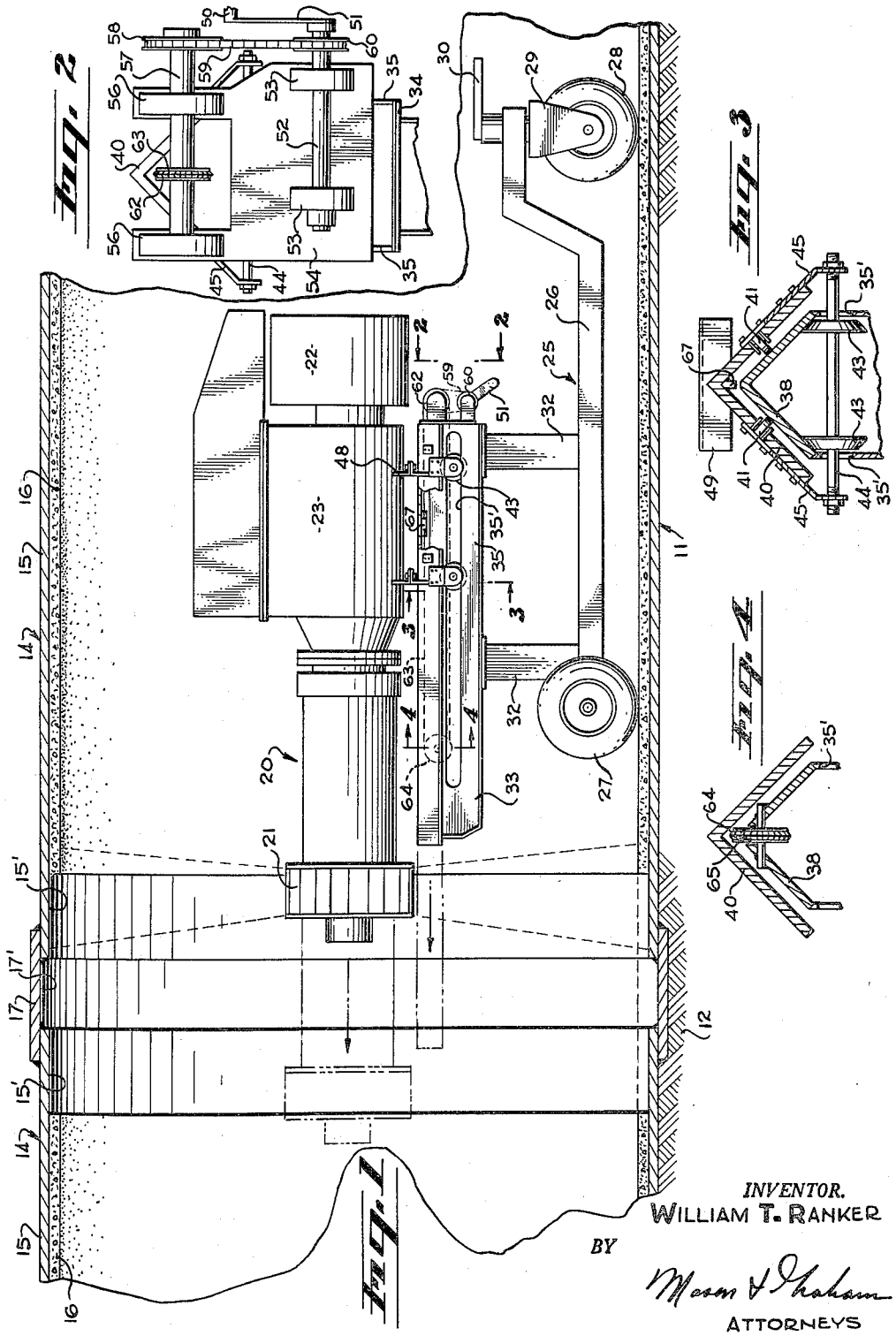
INVENTOR.
WILLIAM T. RANKER
BY
Mason & Graham
ATTORNEYS

United States Patent Office 3,017,855
Patented Jan. 23, 1962

3,017,855
APPARATUS FOR APPLYING A COATING
TO JOINTS IN PIPELINES
William T. Ranker, Norwalk, Calif., assignor to American Pipe and Construction Co., South Gate, Calif., a corporation of Delaware
Filed June 15, 1959, Ser. No. 820,511
7 Claims. (Cl. 118—306)

This invention has to do generally with the application of a coating, such as cement mortar, for example, to the uncoated areas at the joints of a pipeline in place in the ground after the pipeline has been made up of connected internally coated pipe sections which have exposed or uncoated regions at each end where they are joined.

An object of the invention is to provide novel apparatus for accurately controlling the application of coating material to the uncoated inner surface area at each joint of the pipeline and in this connection it is a feature of the invention that use is made of a standard type of pipe coating machine which is customarily employed for the purpose of lining a pipeline in place from end to end.

More particularly it is an object to provide a novel means of mounting and controlling a conventional pipe coating machine in a manner such that it can be moved a limited distance axially of the pipeline under control of the operator and relative to a vehicle or other support therefor.

A further object is to provide a novel mounting suitable for various purposes. These and other objects will be apparent from the drawing and the following description. Referring to the drawing:

FIG. 1 is a fragmentary vertical sectional view through a pipeline showing a joint between pipe sections which is to be coated and showing, in elevation, apparatus embodying the invention within the pipeline;

FIG. 2 is an enlarged end elevational view on line 2—2 of FIG. 1 of a portion of the apparatus shown in FIG. 1;

FIG. 3 is a fragmentary sectional view on line 3—3 of FIG. 2, but on a larger scale; and FIG. 4 is a fragmentary sectional view on line 4—4 of FIG. 1.

More particularly describing the invention numeral 11 generally designates a pipeline which is shown in place in the ground 12. The pipeline is made up of connected pipe sections 14, two of which such sections are fragmentarily shown in the drawing. Each section includes a main wall 15 of metal, such as steel, and an internal coating or layer of cement or cement mortar 16. It is contemplated that the lining 16 is applied to the sections 14 before the sections are placed in the ground and connected, and hence when the sections are connected, as by welding thereto a metal collar 17 which overlaps adjacent ends of the sections, a considerable area of the internal surface of the pipeline remains uncoated in the region of each joint. This area is made up of the inner surface portion 15' at the end of each pipe section 15 and the inner surface 17' of the collar 17.

Heretofore it has been the practice to hand finish the interior of the pipeline by applying a coating to the surfaces 15' and 17'. In place of doing this I propose to provide apparatus for use in conjunction with a conventional pipelining machine, designated generally 20, to permit the use of the machine readily for the purpose of coating the exposed surface areas of the interior of the pipeline. The machine 20 may be of the centrifugal or other type with a head 21 through which the mortar or coating material is propelled or thrown radially outward against the pipe wall to adhere thereto. The machine also has motor 22 and a hopper 23. Normally such a machine is provided with its own wheels so that it can be drawn or propelled through the entire pipeline at a steady rate. Instead of this I provide a carriage 25 comprising a base frame 26, a pair of rear wheels 27, and a front wheel 28. The latter is pivotally mounted in a wheel-supporting structure 29, in turn pivotally mounted in the frame and having a forwardly extending, tiller-like drawbar 30 to which a cable can be attached for advancing the machine through the pipe.

The carriage 25 is provided with a spaced pair of upright posts 32 which support a generally horizontal frame 33 characterized by a base plate 34 and upright side members 35. The latter support a bed or track 38 of inverted V configuration.

The machine 20 is mounted upon a carrier frame 40, also of inverted V-shape which fits over frame 38 in close vertically spaced relation thereto. Several casters or rollers 41 mounted in the member 40 provide an anti-friction bearing between the carrier frame and the track. Also member 40 is fitted with two or more sets of retaining rollers 43 which are carried upon transversely extending axles 44 which extend through slots 35' in the side members 35. The axles are mounted in straps 45 shown bolted to the member 40. The wheels or rollers 43 engage the under surface of track 38.

The machine 20 is secured to member 40 by suitable brackets 48 welded to the under side of the hopper 23 and bolted to brackets 49 welded to member 40.

For the purpose of controlling the movement of the machine 20 relative to the carriage 25 I provide an operating handle 50 forming part of a crank 51 which is fixed to a shaft 52 journaled at 53 upon the end plate 54 of the frame 33. The plate 54 also is provided with the journals 56 which support a shaft 57 to which is affixed a sprocket 58. Shaft 57 is driven by a chain 59 trained around sprocket 60 upon shaft 52 and the sprocket 58. Fixed to shaft 57 is a second sprocket, designated 62, around which extends a chain 63 which passes around an idler sprocket 64 carried at the apex of track 38 near the forward end thereof, the track being slotted at 65 to accommodate the sprocket. The ends of the chain 63 are attached to a mounting block 67 of the member 40.

With the construction, the machine 20 can be advanced from the position in which it is shown in full lines in FIG. 1 to the broken-line position thereof by rotation of the crank 51, and subsequently returned. Thus with the construction provided, the operator can position the carriage 25 and coating machine 20 as shown in FIG. 1, start the machine in operation to coat the pipe, and, with the machine operating, advance the machine by rotating crank 51 to cause the dispensing head 21 to traverse the area of the pipeline to be coated. Thereafter the machine is stopped and the carriage advanced to the next area to be coated where the process is repeated, although, if desired, the machine 20 may be made to traverse the area to be lined from the broken-line position of FIG. 1 to the full line position.

Although I have illustrated and described a preferred form of my invention, I contemplate that various changes and modifications can be made therein without departing from the invention, the scope of which is indicated by the following claims.

I claim:

1. In apparatus for applying a plastic coating material to the inner surface of a pipeline or the like in an uncoated area of limited extent axially of the pipeline as at a region of the joint between two pipe sections thereof having an internal coating except in the joint area, a carriage adapted to be moved along in the pipeline, said carriage having a bed constructed and arranged to extend parallel to the direction of movement of the carriage whereby the bed normally extends axially of the pipeline; a pipe coating machine mounted on said bed for limited movement thereon, and means carried by one of said machine and carriage engageable with the other for effecting relative movement between said machine and said carriage in the direction of said limited movement.

2. In apparatus for applying a plastic coating material to the inner surface of a pipeline or the like in an uncoated area of limited extent axially of the pipeline as at a region of the joint between two pipe sections thereof having an internal coating except in the joint area, a carriage adapted to be moved along in the pipeline, said carriage having a bed constructed and arranged to extend parallel to the direction of movement of the carriage whereby the bed normally extends axially of the pipeline; a pipe coating machine mounted on said bed for limited movement thereon, and operative means for effecting relative movement between said machine and said carriage at a controlled rate, said operative means comprising a manually operable crank on said carriage, and means extending longitudinally of and supported by said carriage and connected to said machine movable in response to rotation of said crank.

3. In apparatus for applying a plastic coating material to the inner surface of a pipeline or the like in an uncoated area thereof of limited axial extent, a carriage adapted to be moved along in the pipeline, said carriage having a track disposed horizontally and extending in the normal direction of travel of the carriage, a pipe coating machine support on said track for limited movement therealong, said support including mechanical antifriction means between said support and said track, and means carried by said carriage for effecting relative movement between said support and said track.

4. The apparatus set forth in claim 3 in which said track comprises a member of inverted V-shape in cross section and in which said support is similarly shaped.

5. The apparatus set forth in claim 3 in which the means carried by said carriage for effecting relative movement between said support and said track comprises a flexible member trained around a pair of spaced wheels on said carriage and attached to said support and a crank for turning one of said wheels.

6. In apparatus for applying a plastic coating material to the inner surface of a pipeline or the like, a carriage, an elevated track fixedly carried by said carriage and extending horizontally thereof, an object-supporting member mounted for limited movement along said track, and means carried by said carriage for moving said object-supporting member relative to the pipeline.

7. In apparatus for applying a plastic coating material to the inner surface of a pipeline or the like, a carriage, an elevated track carried by said carriage and extending horizontally thereof, an object-supporting member mounted for limited movement along said track, said track and said object-supporting member being of inverted V-shape in cross section, rollers carried by said object-supporting member, certain of said rollers engaging the upper side and others engaging the under side of said track, a pair of sprocket wheels spaced apart along said track, crank means for rotating one of said wheels, and a chain trained around said wheels and attached to said object-supporting member.

References Cited in the file of this patent
UNITED STATES PATENTS

| | | |
|---|---|---|
| 1,577,531 | Lambert et al. | Mar. 23, 1926 |
| 2,792,807 | Cummings | May 21, 1957 |

FOREIGN PATENTS

| | | |
|---|---|---|
| 638,211 | Great Britain | June 7, 1950 |